United States Patent [19]

Sanford

[11] Patent Number: 4,469,556
[45] Date of Patent: Sep. 4, 1984

[54] FLOW DISTRIBUTOR

[75] Inventor: Charles L. Sanford, Beloit, Wis.

[73] Assignee: Beloit Corporation, Beloit, Wis.

[21] Appl. No.: 426,612

[22] Filed: Sep. 29, 1982

[51] Int. Cl.³ .............................................. D21D 5/02
[52] U.S. Cl. .................................. 162/380; 210/330; 210/331; 210/456
[58] Field of Search ............... 162/380, 336, 338, 343; 210/330, 331, 456

[56] References Cited

U.S. PATENT DOCUMENTS

| | | | |
|---|---|---|---|
| 1,771,600 | 7/1930 | Yoder | 162/343 |
| 2,572,869 | 10/1951 | Koonce et al. | 210/456 X |
| 2,660,935 | 12/1953 | Chapman | 162/380 X |
| 3,351,522 | 11/1967 | Lopas | 162/343 |
| 3,962,031 | 6/1976 | Bubik et al. | 162/343 X |
| 4,230,575 | 10/1980 | Lizeé | 210/456 X/ |

Primary Examiner—Richard V. Fisher
Attorney, Agent, or Firm—Hill, Van Santen, Steadman & Simpson

[57] ABSTRACT

A mechanism for processing paper stock to be supplied to a papermaking machine with a filter having a plurality of axially spaced disks on a horizontal axis with a receiving chamber for receiving stock distributed over an elongate area along which the filter disks are distributed, a flow distributor having a broad delivery channel connected to feed stock to the filter receiving chamber and a broad main flow channel in communication with the delivery channel and a receiving passage at one end with a plurality of baffles in the main flow channel having a main wall portion defining flow passed therebetween and an entry wall portion extending in the direction of flow in the main channel so as to cause the flow to reverse directions, with the main flow channel being tapered from the entry end to the opposite end.

9 Claims, 4 Drawing Figures

FLOW DISTRIBUTOR

BACKGROUND OF THE INVENTION

The present invention relates to improvements in mechanisms for preparing stock for papermaking machines, and more particularly to an inlet flow distributor for a stock filter.

One of the operations in the preparation of stock for a papermaking machine is filtering the stock, whether such stock is original virgin stock or whether it is reprocessed stock, the fibers are suspended in a liquor or a liquid suspension and fed to a filter which separates the fibers from the liquor. The filters generally have a broad or an elongate filter area and a frequently used filter construction employs a plurality of rotatable disks mounted on a horizontal axis with the stock preferably fed to an elongate receiving chamber. For optimum effectiveness of the filtering operation, it is desirable that all of the filter disks along the chamber be supplied with stock at uniform velocity so that each of the filter disks carries or receives an equal flow. Devices for supplying stock to the filter arrangement have frequently employed cascading pipes which do not insure uniform flow across the length of the filter, which are expensive to build and consume unnecessary space.

It is accordingly an object of the present invention to provide an inlet flow distributor such as for a multiple disk filter which avoids the disadvantages of structures heretofore available such as cascading pipe arrangements and which is capable of continual operation in feeding and distributing a flow of stock uniformly across the filter.

A further object of the invention is to provide a flow distributor and filter wherein the flow is conducted through a transverse tapered header and is distributed along the filter vat by a series of L-shaped vanes having a lead-in arrangement which reverse the direction of flow as it enters the distributor.

A further object of the invention is to provide a flow distributor and filter arrangement wherein the flow to the filter is uniform, and the system is not large or cumbersome nor expensive to fabricate and does not require relatively large space for installation.

A feature of the invention is the provision of a feed system with a filter consisting of a single channel extending along the entire length of the filter chamber or vat having an array of baffles of unique design which turn the flow in a direction opposite to the entry flow and direct it into the vat. The entry channel is supplied by a single inlet pipe eliminating the branching array of inlet pipes of structures heretofore available. The bottom of the channel is tapered upward in the direction of flow to maintain an essentially constant velocity in the channel. The baffles arranged along the channel are L-shaped having a main wall portion with a short entry leg portion which projects in the direction of flow in the channel so that the flow must flow around the entry portion to reverse its direction. The baffles are thus L-shaped with the foot of the L smoothly rounded with enough radius to prevent the fibers from stapling to it, and the main wall portion long enough to effectively turn the direction of flow and prevent a significant cross direction component of velocity. The short or entry leg restricts the area available for flow to leave the channel and enter the spaces between the baffles providing some resistance to flow which contributes to the evenness of distribution.

Other objects, advantages and features, as well as equivalent structures which are intended to be covered herein will become more apparent from the teaching of the principles of the invention in connection with the disclosure of the preferred embodiment thereof in the specification, claims and drawings, in which:

DRAWINGS

DESCRIPTION

Figure 1:
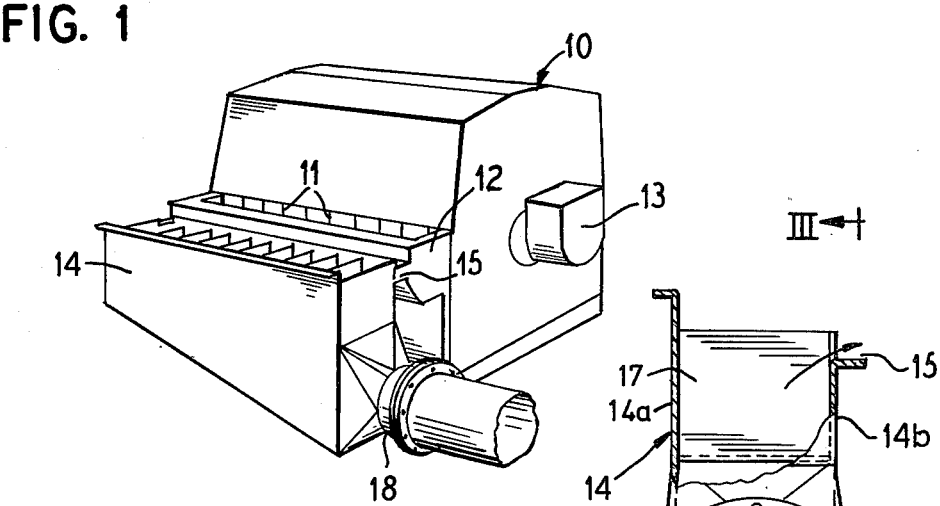
FIG. 1 is a somewhat diagrammatic perspective view of a distributor with a filtering arrangement constructed and operating in accordance with the principles of the present invention.
Figure 2:
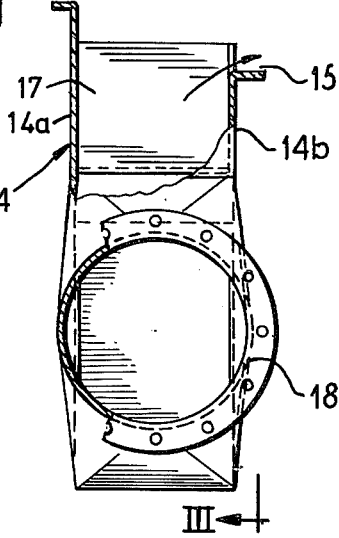
FIG. 2 is an end elevational view, partially in section, showing the flow distributor.

As illustrated in FIG. 1, a filter distributor combination is shown with the filter being included in a main filter housing 10. Within the filter housing are a plurality of axially spaced filter disks 11 which are mounted on a horizontal axis to be driven in rotation with a drive motor 13 being provided for that purpose.

The filters rotate in a chamber, and are provided with a receiving chamber or vat 12 into which the stock is fed. Optimumly, the stock is supplied uniformly at uniform velocity all across the receiving chamber 12 in a manner to prevent significant cross directional components of velocity in the receiving chamber 12. The stock constitutes fibers in suspension in a liquor and in the washing and filtering operation, the fibers are caught on the outside surfaces of the disks as they rotate in the bath with the liquid and liquor being drawn through the filtering disks and the disks rotating to carry the fibers out of the bath which exists in the receiving chamber, and the fibers being removed from the surfaces of the disks as they rotate to the other side of the housing 10. Optimumly, the stock flows uniformly into the receiving chamber or vat 12 which an absence of cross components of flow so that uniform filtering is conducted by each of the disks and from both sides of the hollow disks. Also, the absence of cross component flows prevents any nonuniform disturbance of the collection of fibers on the disk surfaces.

A distributor 14 is connected to the filter housing 10 and delivers the stock through a broad delivery channel 15 in communication across the width of the filter receiving chamber 12.

Figure 3:
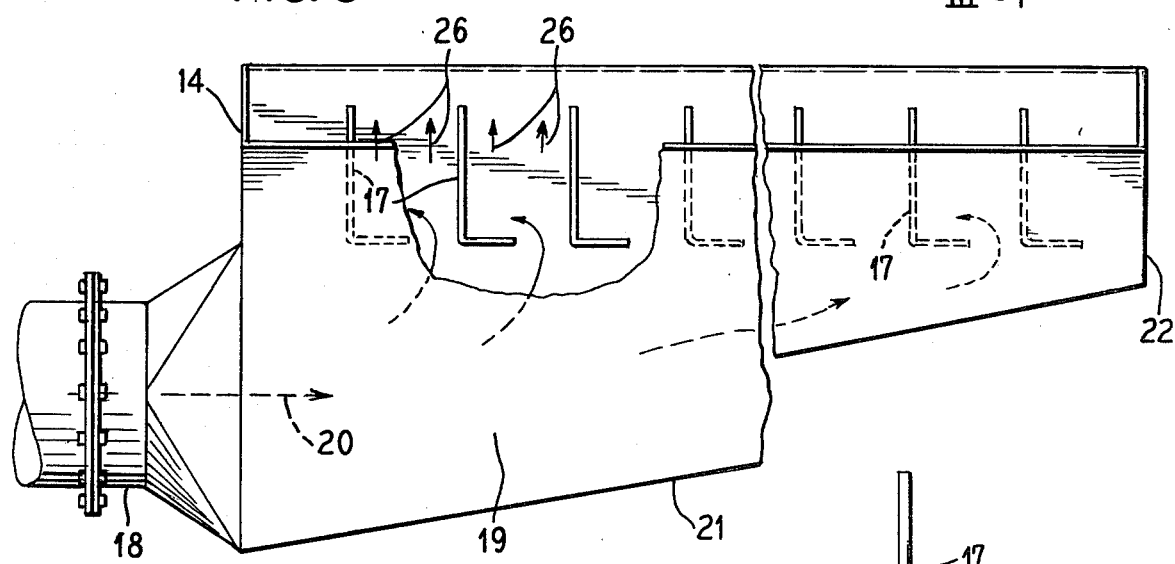
FIG. 3 is an elevational view, partially in section generally as viewed along line III—III of FIG. 2.
Figure 4:
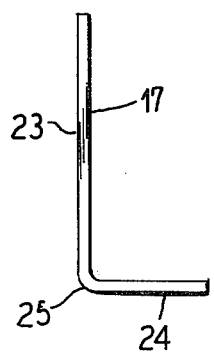
FIG. 4 is a somewhat detailed elevational view of baffles which are employed.

Within the distributor 14 is a broad main flow channel 19 into which the material flows in the direction of the arrowed line 20, FIG. 3. The stock enters the distributor through a receiving passage 18 at one end of the main flow channel 19. The stock will be transmitted to the distributor by suitable pump means, not shown.

The main flow channel 19 has its lower wall 21 tapered from the entry end at the receiving passage 18 to the opposite end 22 so as to insure a uniform velocity of flow as the supply of stock is fed off laterally through passages 26 defined between vanes or baffles 17. The baffles are preferably flat or planar and are uniformly spaced so that the flow distributor paths 26 therebetween are of uniform size. The baffles extend the full thickness of the vat from one wall 14a to the other wall 14b.

The baffles uniquely reverse the direction of flow from the main flow channel, as indicated by the arrowed line 20, and for this purpose, have an entry wall portion 24 connected at 25 to form an L-shape to the main wall portion 23. The main wall portion is preferably planar or flat, and the leg or entry wall portion 24 is joined thereto in a smooth curve so as to provide a round nose which prevents fibers from stapling thereon. The main wall or vertical leg 23 should be long enough relative to the spacing between baffles to effectively turn the direction of flow to be lateral and toward the vat 12 and prevent a significant cross directional component of velocity in the vat. The entry wall or short leg 24 restricts the area available for flow to leave the main channel 19 and thereby provide some resistance to flow which contributes to the evenness of distribution.

As an example of a construction in accordance with the invention, one specific design may be provided with an 18" diameter inlet 18. This will handle a flow rate ranging from 2400 gallons per minute to 4800 gallons per minute. The overall length of the channel 19 depends on the freeness of the material to be filtered, and typically for relatively easy draining linerboard pulp furnish, the length might be 110". The overall dimensions of the distributor can be varied to suit the particular flow rate, and the size will be dependent upon the disk filter to be serviced.

Thus, it will be seen I have provided an improved mechanism for handling paper stock including a filter and a distributor which attains the objectives above set forth and provides a capability for improved filtering with increased capacity at a reduced cost of construction.

I claim as my invention:

1. A mechanism for processing paper stock to be supplied to a papermaking machine, comprising in combination:
    a stock filter having an elongate filter area with a receiving chamber for receiving a flow of distributed stock;
    a flow distributor having a broad delivery channel connected to feed stock to said filter receiving chamber with a broad main flow channel in communication with the delivery channel and a receiving passage leading to the main channel;
    a plurality of baffles defining distributing paths therebetween turning the flow in a direction opposite to the flow direction of the stock in the receiving passage with the stock flowing to said filter area at uniform flow velocities across the filter area for uniform filtering;
    said flow distributor delivery channel and said main flow channel extending horizontally and said baffles being vertical and defining vertical distributing paths; and
    said baffles having a main wall leading to the delivery channel and having an entry wall at right angles to said main wall extending in the direction of flow through the receiving passage so as to cause a reverse of flow from the receiving passage.

2. A mechanism for processing paper stock to be supplied to a papermaking machine, comprising in combination:
    a stock filter having an elongate filter area with a receiving chamber for receiving a flow of distributed stock;
    a flow distributor having a broad delivery channel connected to feed stock to said filter receiving chamber with a broad main flow channel in communication with the delivery channel and a receiving passage leading to the main channel;
    a plurality of baffles defining distributing paths therebetween turning the flow in a direction opposite to the flow direction of the stock in the receiving passage with the stock flowing to said filter area at uniform flow velocities across the filter area for uniform filtering; and
    the stock filter having a plurality of axially spaced filters mounted on an axis extending parallel to the elongate filter area with the stock flow entering between the filters.

3. A mechanism for processing paper stock to be supplied to a papermaking machine constructed in accordance with claim 2:
    and including means for driving the individual filters in rotation about their axes.

4. A mechanism for precessing paper stock to be supplied to a papermaking machine constructed in accordance with claim 2:
    wherein said receiving passage is located at one end of said main flow channel of the distributor so that the flow of the stock entering the distributor is all in one direction.

5. A mechanism for processing paper stock to be supplied to a papermaking machine constructed in accordance with claim 4:
    wherein the distributor main flow channel is tapered to be uniformly reduced in width from one end to the other with said receiving passage being located at said one end.

6. A mechanism for distributing the flow of stock over a laterally extended area to a stock filter having an elongate broad filter area for supplying the stock to a papermaking machine, comprising in combination:
    a flow distributor having a broad delivery channel for feeding stock to the broad filter area and having a broad main flow channel in communication with said delivery channel with a receiving passage leading to said main flow channel;
    a plurality of baffles defining distributing paths therebetween being in said main flow channel turning the flow in a direction opposite to the flow direction in the receiving passage; and
    said baffles having a main wall portion extending transverse to the flow in said distributor main flow channel and having an entry wall portion at right angles to the main wall portion.

7. A mechanism for distributing the flow of stock over a laterally extended area to a stock filter having an elongate broad filter area for supplying the stock to a papermaking machine constructed in accordance with claim 6:
    wherein said main flow channel is tapered from said receiving passage at one end to diminish in cross sectional size to the other end of the channel.

8. A mechanism for processing paper stock to be supplied to a papermaking machine, comprising in combination:
    a stock filter having an elongate filter area with a receiving vat for receiving a flow of distributed stock;
    a flow distributor having a broad delivery channel connected to feed stock to said vat and having a broad main flow channel in communication with the delivery channel which is tapered in the direction of flow and is provided with an inlet at the widest end; and a plurality of L-shaped baffles within the distributor channel with a short leg extending in the direction of flow and limiting the flow entry to the space between the baffles.

9. A mechanism for processing paper stock to be supplied to a papermaking machine constructed in accordance with claim 8:

and including a rounded nose portion between the leg and body of at least one L-shaped baffle to prevent fibers from stapling onto the baffle.

* * * * *